United States Patent Office 3,576,007
Patented Apr. 20, 1971

3,576,007
WATER SOLUBLE SALTS OF ELLAGIC ACID
Francis A. Hochstein, New London, Conn., assignor to Pfizer Inc., New York, N.Y.
No Drawing. Filed Jan. 16, 1967, Ser. No. 609,346
Int. Cl. A61k 27/00; C07d 7/24
U.S. Cl. 260—343.2      2 Claims

ABSTRACT OF THE DISCLOSURE

The soluble dicholine and bis-triethylamine salts of ellagic acid are prepared, aqueous solutions of which are useful as intravenously injectable hemostatic agents.

---

This invention relates to novel salts of ellagic acid and their use as intravenously administrable hemostatic agents. In particular, it relates to dicholine and bis-triethylamine ellagate and aqueous solutions thereof.

Ellagic acid (4,4',5,5',6,6'-hexahydroxydiphenic acid 2,6,2'-6'-dilactone) is known to induce a "hypercoagulable" state in blood, the effect being thought to proceed through activation of Hageman factor. The effect is achieved by synthetic ellagic acid as well as by the natural product, and is observed in vitro and in vivo in a variety of animals. There is little or no absorption of the acid with oral administration, so that administration by intravenous injection of an aqueous solution is preferred. However, ellagic acid and its common salts are highly insoluble materials, rendering this method of administration extremely inconvenient and difficult. The prior art teaches that in order to introduce into a host the desired quantity of ellagic acid, it is necessary to inject approximately 10 ml. of a solution of the sodium salt per kilogram of body weight, a ratio which precludes the practical use of ellagic acid as a hemostatic agent. All the heretofore known salts of ellagic acid, such as the alkali, alkaline earth, and transition metal salts, are insufficiently soluble to permit their use as hemostatic agents.

It is the purpose of this invention to provide forms of ellagic acid which are sufficiently soluble to permit the use of solutions thereof as practical intravenously injectable hemostatic agents. It has now been found that the novel dicholine and bis-triethylamine salts of ellagic acid are surprising soluble in aqueous alkaline solution, approximately 100 mg./ml. and 55 mg./ml., respectively. These solubility characteristics are unusual and unexpected in light of the insolubility of heretofore known ellagic acid salts. Thus, the high solubility of the dicholine and bis-triethylamine salts permits the use of aqueous solutions of these salts as a means of administering ellagic acid by intravenous injection. Aqueous solutions of the instant salts permit administration of volumes which are only 1–2%, and even less, of volumes required of the heretofore known solutions of ellagate salts; this phenomenon provides a surprisingly convenient and effective means of administering ellagic acid for use as a hemostatic agent.

The prior art teaches that approximately 0.3–0.6 milligram of acid per kilogram of body weight induces hemostasis in animals such as rats, rabbits, dogs and cats. Of course, the actual dose of the instant salt solutions to be administered will be determined by the physician or other person prescribing their use. However, it is expected that doses of 0.1 mg. to 1.0 mg./kg. of the instant salts will induce hemostasis, and that even lower doses might be effective.

In using aqueous solutions of dicholine and bis-triethylamine ellagate as hemostatic agents, care normal to all administrations by the intravenous route must be exercised with regard to the solution concentrations. Somewhat less than the maximum concentration should be employed to avoid the possibility of injecting suspensions resulting from precipitation from a supersaturated solution. Also, very low concentrations should be avoided; since ellagic acid is a weak acid, with a pK if about 7, it is possible that dilute solutions of the salts may undergo partial neutralization by absorbing carbon dioxide from air, or by hydrolysis, resulting in precipitation of the exceedingly insoluble free acid. Therefore, it is necessary to use solutions of the salts, which are basic materials, sufficiently concentrated or otherwise treated to maintain the pH above about 8.0. Of course, at pH 8 the salts of the instant invention are less soluble than in more basic solutions, the solubility being about 3 mg./ml. When the solution is to be administered at a slow rate over an extended period, it is often desirable to make use of a solution of pH 8 for reasons of physiological comfort, in spite of the lower solubility. However, it is preferable to make up solutions of a pH of at least about 8.5 to take advantage of the higher solubility thereby made possible. A maximum pH of about 11.0, and preferably of about 10.5, should ordinarily be observed for reasons of physiological comfort, although circumstances may warrant use of a solution with greater pH. As noted hereinbefore, solutions of dicholine and bis-triethylamine ellagate are basic, but buffers of appropriate alkaline pH, low in common metal ions, may be added to the solution if so desired. Especially, it may be desirable to add small amounts of triethylamine to solutions of bis-triethylamine ellagate to maintain the pH necessary to ensure the solubility of the salt. Thus, compositions comprising at least about 3 milligrams per milliliter of the dicholine or bis-triethylamine salts of ellagic acid in a pharmaceutically acceptable aqueous vehicle at a pH between about 8.0 and 11.0 are intravenously injectable hemostatic agents. A preferred embodiment of the instant invention is a composition comprising at least about 10 milligrams per milliliter of the dicholine salt of ellagic acid in a pharmaceutically acceptable vehicle at a pH between about 8.5 and 10.5. The aqueous solution of dicholine ellagate is the preferred composition for use as an injectable hemostatic agent because of the greater solubility of the salt, the greater ease of isolating the salt in pure form and the established physiological acceptability of choline salts. It is understood that the instant invention embraces solutions of dicholine and bis-triethylamine ellagate in aqueous vehicles acceptable for intravenous injection, provided that said vehicles do not contain metal ions in sufficient concentration to cause precipitation of ellagate salts.

The hemostatic agents obtained by the instant invention are superior to presently available materials in that they have an immediate and potent effect of a convenient and desirable duration. Also, the effect is not dependent upon the existence of certain chemical deficiencies in the body of the host.

Ellagic acid is a naturally occurring substance, readily available as a non-toxic component of dicotyledonous plants such as the food sources guava, raspberries, walnuts, and cloves. The free acid, glycosides and methyl ethers all occur naturally. In addition, the acid can be synthesized by methods taught in the prior art. The salts are synthesized by treating the free acid with an equivalent amount or preferably an excess of the corresponding base, viz., choline or triethylamine. Appropriate solvents, such as water, methanol, dimethylsulfoxide and dimethylformamide may be used, and heating will often be advantageous. Isolation of the salts is accomplished by means generally familiar to those skilled in the art, such as crystallization with appropriate pH adjustments, removal of solvent, and adjustment of solvent compositions. It is to be noted that care must be exercised in the isolation and purification of the bis-triethylamine salt; heat and reduced pressure will cause a loss of triethylamine, resulting in a mixture of the mono- and dibasic salts.

The following examples are given to more fully illustrate the instant invention. It is understood that these examples are for illustrative purposes only, and are not to be considered as the only manner in which the invention may be embodied.

EXAMPLE I

Dicholine ellagate

To a mixture of ellagic acid (6 g., 0.02 mole) in 100 ml. of dimethylformamide and 100 ml. of water was added 12.5 ml. of a 50% methanolic solution of choline (6.2 g., 0.05 mole). The mixture was heated to 100° C., and the remaining trace of insoluble material was removed by filtration. The water was then removed in vacuo, and the remaining solution cooled and allowed to crystallize. The precipitate was collected by filtration, washed with 100 ml. of boiling methanol for 10 minutes, and dried to a constant weight at 80° C./0.02 mm. Hg. for 3.5 hours, yielding dicholine ellagate, 5.4 g. (54%), M.P. 268–269° C. (decomp.).

*Analysis.*—Calc'd for $C_{14}H_4O_8 \cdot 2C_5H_{14}NO$ (percent): C, 56.74; H, 6.35; N, 5.51. Found (percent): C. 56.99; H, 6.31; N, 5.46.

EXAMPLE II

Bis-triethylamine ellagate

Ellagic acid (21 g., 0.07 mole) was dissolved in 500 ml. of dimethylformamide and 25 ml. of triethylamine (18 g., 0.18 mole) at 80° C. After refrigeration for about 15 hours, 13 g. of crude bis-triethylamine ellagate was isolated by filtration. Two grams of this crude salt was redissolved in 10 ml. of dimethylformamide and 0.1 ml. of triethylamine at 120–130° C. On cooling, pale yellow crystals of bis-triethylamine ellagate separated and were collected by filtration.

EXAMPLE III

Intravenously injectable hemostatic agents are prepared by the following procedures, using dicholine ellagate as prepared by the procedure of Example I:

(1) Dicholine ellagate (30 mg.) is dissolved in 10 ml. of water and the resulting solution is divided into 4 aliquots. Hydrochloric acid is added to adjust the pH of 2 aliquots to 8.0 and 8.5, respectively, and chlorine is added to the remaining 2 aliquots to ajust the pH to 10.5 and 11.0, respectively.

(2) Dicholine ellagate (100 mg.) is dissolved in 10 ml. of water and the resulting solution is divided into 2 aliquots. Hydrochloric acid is added to one aliquot to adjust the pH to 8.5, and choline is added to the other to adjust the pH to 10.5.

(3) Dicholine ellagate (750 mg.) is dissolved in 10 ml. of water. Hydrochloric acid is added to the resulting solution to adjust the pH to 9.5.

The intravenously administerable solutions thus prepared do not precipitate ellagic acid upon standing.

EXAMPLE IV

Intravenously injectable hemostatic agents are prepared by the following procedures, using bis-triethylamine ellagate as prepared by the procedure of Example II:

(1) Bis-triethylamine ellagate (30 mg.) is dissolved in 10 ml. of water and the resulting solution is divided into 4 aliquots. Hydrochloric acid is added to 2 aliquots to adjust the pH to 8 and 8.5, respectively, and choline is added to the remaining aliquots to adjust the pH to 10.5 and 11.0, respectively.

(2) Bis-triethylamine ellagate (400 mg.) is dissolved in 10 ml. of water; the resulting solution has a pH of about 9.5.

The intravenously administerable solutions thus prepared do not precipitate ellagic acid upon standing.

EXAMPLE V

Five ml. aliquots of blood were withdrawn from each of 5 rabbits and 0.1 ml. of recalcified, citrated plasma obtained from each aliquot were transferred to silicone-coated test tubes. To each test tube was added 0.1 ml. of aqueous dicholine ellagate ($3 \times 10^{-7}$ M). Mean clotting time for the 5 samples was 8.8 minutes; mean clotting time for 5 control samples was 22.2 minutes.

Similar results are obtained by using bis-triethylamine ellagate in place of said dicholine ellagate.

EXAMPLE VI 0.23 ml. of aqueous dicholine ellagate (50 mg./ml., pH 9.4) was injected intravenously into rabbits weighing approximately 2.3 kg. A decrease in silicone clotting time of blood samples withdrawn from said rabbits was observed with respect to the clotting time of control blood samples.

EXAMPLE VII

An aqueous solution of dicholine ellagate was administered by intravenous injection to anesthetized rats, in an amount to provide a dosage of 0.6 mg./kg. body weight. Immediately after the administration of the solution, a portion of each animal's tail was amputated and the volume of the resulting blood loss was measured for one hour. The average blood loss was 3.0 ml.; the average volume of blood loss of similarly treated control animals was 6.3 ml.

What is claimed is:
1. The dicholine salt of ellagic acid.
2. The bis-triethylamine salt of ellagic acid.

References Cited

Fiedler et al., C. A. 48: 13097 (11–54).
Botti, et al., J. Lab. Clin. Med. 64(3): 385–98 (9–64).

HENRY R. JILES, Primary Examiner

C. M. SHURKO, Assistant Examiner

U.S. Cl. X.R.

424—279